United States Patent
Liu et al.

(10) Patent No.: US 9,906,634 B2
(45) Date of Patent: Feb. 27, 2018

(54) COMMUNICATION METHOD FOR A SMART PHONE WITH A TEXT RECOGNITION MODULE

(71) Applicants: Chi Wen Liu, Hsinchu (TW); Ching Yu Chang, Yilan County (TW); Kuo Ching Chiang, New Taipei (TW)

(72) Inventors: Chi Wen Liu, Hsinchu (TW); Ching Yu Chang, Yilan County (TW); Kuo Ching Chiang, New Taipei (TW)

( * ) Notice: Subject to any disclaimer, the term of this patent is extended or adjusted under 35 U.S.C. 154(b) by 106 days.

(21) Appl. No.: 15/071,122

(22) Filed: Mar. 15, 2016

(65) Prior Publication Data

US 2017/0026502 A1   Jan. 26, 2017

Related U.S. Application Data

(63) Continuation-in-part of application No. 11/120,005, filed on May 2, 2005, now abandoned.

(51) Int. Cl.
| | | |
|---|---|---|
| *H04M 1/253* | (2006.01) | |
| *H04W 4/00* | (2018.01) | |
| *H04L 29/06* | (2006.01) | |
| *H04M 1/725* | (2006.01) | |
| *H04W 88/06* | (2009.01) | |
| *H04W 84/12* | (2009.01) | |
| *G10L 15/26* | (2006.01) | |

(52) U.S. Cl.
CPC ........ *H04M 1/2535* (2013.01); *H04L 65/403* (2013.01); *H04M 1/72502* (2013.01); *H04M 1/72519* (2013.01); *H04W 4/008* (2013.01); *H04W 88/06* (2013.01); *G10L 15/26* (2013.01); *H04M 2250/02* (2013.01); *H04M 2250/06* (2013.01); *H04W 84/12* (2013.01)

(58) Field of Classification Search
CPC ........... H04M 1/2535; H04M 1/72502; H04M 1/72519; H04M 2250/06; H04L 65/403; H04W 4/008; H04W 88/06; H04W 84/12; G10L 15/26

See application file for complete search history.

(56) References Cited

U.S. PATENT DOCUMENTS

| | | | | |
|---|---|---|---|---|
| 7,668,754 | B1 * | 2/2010 | Bridgelall | G06Q 30/06 705/26.9 |
| 2002/0097692 | A1 * | 7/2002 | Ruotoistenmaki | H04M 1/2535 370/328 |
| 2004/0014456 | A1 * | 1/2004 | Vnnen | H04W 4/24 455/413 |
| 2004/0120293 | A1 * | 6/2004 | Hassan | H04W 40/02 370/338 |
| 2008/0162471 | A1 * | 7/2008 | Bernard | G06F 17/30017 |

* cited by examiner

*Primary Examiner* — Duc C Ho
(74) *Attorney, Agent, or Firm* — Chih Feng Yeh; Huntington IP Consulting Co., Ltd

(57) ABSTRACT

A portable device can transmit information through one of a mobile phone network and an Internet, wherein the portable device includes a text-based communication module to allow a user may synchronously transmit or receive data through a local area network, wherein the data is text, audio, video or the combination thereof. The text-based communication module of the portable device includes a text-to-speech recognition module used to convert a text data for outputting the text data by vocal, and a read determination module for determining read target terminals and unread target terminals when a user of the portable phone device activates the read determination module.

17 Claims, 6 Drawing Sheets

COMMUNICATION METHOD FOR A SMART PHONE WITH A TEXT RECOGNITION MODULE

This application is a continuation in part application related to patent application Ser. No. 11/120,005 titled "Portable communication device with internet phone module".

FIELD OF THE INVENTION

The present invention relates to a portable device, particularly to a portable device that is capable of providing communication service via WLAN.

BACKGROUND OF THE INVENTION

Because of the development of the information technology (IT), the information could be exchanged with higher capacity and faster speed. Internet is designed as an open structure to exchange information freely without restriction. Thus, certain communication service requiring real time information exchange, such as viewing a live video, has become feasible through Internet. The VoIP (Voice over Internet Protocol) is a popular Internet protocol about the transmission of voice data packets. Conventionally, the VoIP operators are needed to obtain telephone lines from phone companies for linking themselves to the regular phone systems. Therefore, the applications of VoIP are still constrained within the Internet users.

Some mobile computing devices, such as, for example, laptop computers, netbooks, tablets and cell phones can be configured with a data plan that provides service for mobile telephone and mobile Internet access, such as, access to electronic mail, short message service (SMS) (e.g., text messaging) and multimedia messaging service (MMS) through a cellular mobile network (e.g., a CDMA network, a GSM network, a GPRS network, an EV-DO network, an EDGE network, an LTE network, an HSPA+ network, a UMTS network, etc.).

Cellular communications systems typically include multiple base stations for communicating with mobile stations in various geographical transmission areas. Each base station provides an interface between the mobile station and a telecommunications network. Mobile telephone systems are in use or being developed in which the geographic coverage area of the system is divided into smaller separate cells, it communicates with the network via a fixed station located in the cell. Mobile telephones belonging to the system are free to travel from one cell to another. When a subscriber within the same system or within an external system wishes to call a mobile subscriber within this system, the network must have information on the actual location of the mobile telephone. In pace with the development of information and computer technology, the electronic products grow rapidly with the trend of small size, multifunction and high operation speed. Based on the development of cellular integration technology, communication systems have also been introduced to allow users obtain information more convenient. Thus, the business accompanied with the communication device flourish as well due to the development of the communication technology. The internet and communication service providers also offer business services to assist clients to transfer information or extend the market. The cellular manufactures have to release new models with different appearances, function and styles more frequently so as to attract the attention of the buyer and occupy a favorable marketing share. Communication services providers or information services providers also have to provide diverse, comprehensive and latest information to clients. However, text message received by the communication module is generally display on the screen for reading by a user. Differently, the present invention introduces a new method to read the received text message.

SUMMARY OF THE INVENTION

The present invention provides a system for synchronously communication via internet comprising a local area network and a terminal is coupled to the internet; a portable device with dual network linking capability module is used to transmit information through a RF module or the wireless local area network (WLAN) module, wherein the portable device includes an internet phone module and the WLAN module to allow a user may synchronously transmit or receive data through the internet, portably, wherein the transmitted information is selected from audio signal, video signal and the combination thereof. The terminal can be a computer, a personal digital assistant (PDA), a notebook, cellular or a smart phone, which is able to access the internet network via the local area network. The system further comprises a mobile phone communication service network. The system further comprises an exchanging service mechanism bridging the internet and the mobile phone network to facilitate the communication there between. The system may further comprise a public switch telephone network (PSTN).

The present invention provides a portable device for synchronously communication via internet comprising: a central control unit, an operation panel, a display, an operation system and memory coupled to the central control unit, respectively; a RF module that is compatible to a mobile phone communication protocol; a wireless local area network (WLAN) module that is compatible to a local area network protocol; CODEC and A/D converter are coupled to the WLAN module and the RF module; a vocal I/O unit is coupled to the A/D converter; and an Internet phone module is introduced, the Internet phone module accompany with the WLAN module allow a user may synchronously transmit or receive data through Internet by the wireless local area network module, portably, wherein the data is selected from the group consisting of audio signal, video signal and the combination thereof. The WLAN module includes Bluetooth standard compatible module, Wi-Fi standard compatible module or 802.11x standard compatible module, wherein the x can be a, b, or g. The wireless local area network (WLAN) module could be compatible to the WiMAX (Worldwide Interoperability for Microwave Access) standard.

The present invention provides a portable device with dual network linking capability module to transmit or receive information through a mobile phone communication service network or the Internet, wherein the portable device includes an Internet phone module and the WLAN module to allow a user may synchronously transmit or receive data through the local area network, portably, wherein the data is selected from audio, video and the combination thereof.

The present invention discloses a method for a portable device to communicate through an Internet, comprising: providing the portable device with an Internet phone module and a wireless local area network (WLAN) module; coupling to the Internet via the wireless local area network (WLAN) module by using the Internet phone module; transmitting or receiving data through the Internet via the WLAN module, portably, wherein the data is audio signal, video signal, digital data and the combination thereof.

The portable device further comprises a RF module and a wired data I/O interface. The wireless local area network (WLAN) module includes Bluetooth standard compatible module, Wi-Fi standard compatible module, includes 802.11x standard compatible module or WiMAX (Worldwide Interoperability for Microwave Access) standard compatible module.

The present invention discloses a method for a smart phone having a wireless local area network (LAN) module to communicate through one of a mobile phone network and an Internet, the method comprising: providing a text based communication module to the smart phone with the wireless local area network (LAN) module to access the internet and establish communication with a target terminal via the Internet using the wireless LAN module, wherein the text based communication module includes a text-to-speech recognition module; wirelessly coupling the text based communication module to the Internet, via the wireless LAN module, to enable a user to communicate with the target terminal, via the Internet using the wireless LAN module; wirelessly receiving a text data from the target terminal, via the Internet by the text based communication module; and converting the text data by the text-to-speech recognition module for outputting the text data by vocal.

Alternatively, the present invention discloses a group conversation method for a smart phone through one of a mobile phone network and an Internet, the method comprising: providing a text-based communication module to the smart phone with a wireless local area network (LAN) module to access the internet and establish communication with target terminals of the smart phone conversation group via the Internet using the wireless LAN module, wherein the text-based communication module includes a read determination module; wirelessly coupling the text-based communication module to the Internet, via the wireless LAN module, to enable a user to communicate with the target terminals of the smart phone conversation group, via the Internet using the wireless LAN module; wirelessly receiving a message from the smart phone conversation group, via the Internet using the wireless LAN module and the text-based communication module; and displaying a list of read and unread message target terminals of the smart phone conversation group when the user of the smart phone activates the read determination module. The read determination module and the text-to-speech recognition module may be incorporated together or separated in the invention.

BRIEF DESCRIPTION OF THE DRAWING

For a better understanding of the present invention and to show how it may be implemented, reference will now be made to the following drawings.

DESCRIPTION OF THE PREFERRED EMBODIMENT

The present invention is described with the preferred embodiments and accompanying drawings. It should be appreciated that all the embodiments are merely used for illustration. Hence, the present invention can also be applied to various embodiments other than the preferred embodiments.

In the present invention, a text based communication module is provided to a portable communication device, such as smart phone, or tablet, with a wireless local area network (LAN) module to access internet, and thus the text based communication module in the portable communication device is wirelessly coupled to Internet via the wireless LAN module to reduce transmission fee; the captured image and the text format data is wirelessly transmitted to the first target terminal wirelessly coupled to Internet, and the second target terminal coupled to mobile phone network, via Internet using the wireless LAN module and the text based communication module to reduce transmission fee. The present invention may wirelessly couple the text based communication module to Internet via the wireless LAN module. The present invention may wirelessly couple the text based communication module to Internet via the wireless LAN module to communicate with other target terminal. The captured image is wirelessly transmitted to first target terminal wirelessly coupled to Internet, and second target terminal coupled to mobile phone network, via Internet using the wireless LAN module and the text based communication module. In the present invention, a text format data of the portable phone device is synchronously wirelessly transmitted to first target terminal and second target terminal, via Internet using the wireless LAN module and the text based communication module.

Figure 1:
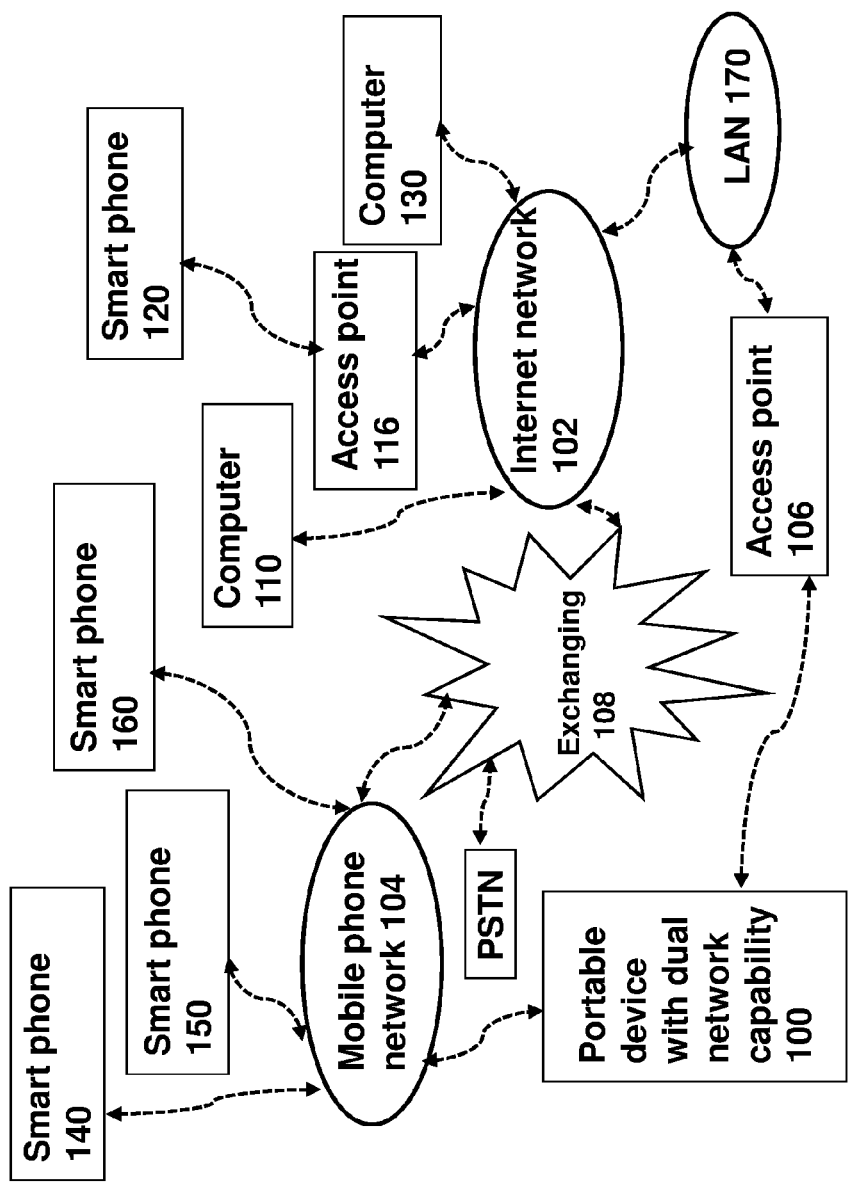
FIG. 1 is a block diagram showing the communication service system of the present invention.

In FIG. 1, the system includes at least two different communication networks including a mobile phone network 104 such as a GSM, CDMA or PHS communication service network and a local area network (LAN) 170 is coupled to an Internet network 102. It should be noted that the LAN 170 is optional. There are pluralities of terminals of the users in FIG. 1. For example, the terminals (such as tablet, smart phone) 140, 150 and 160 of the users are coupled to the mobile phone communication service network 104. Similarly, communication devices (such as computers, tablets, smart phones) 110, 120, and 130 are coupled to the Internet network 102, respectively. In one case, computers 110 and 130 are wired to the Internet network 102 while the smart phone 120 is wirelessly coupled to the Internet network 102 through the access point 116. It should be noted that the number of the terminals can be changed, and the present invention would encompass any possible number of the terminals. As we can see, computers are all coupled to Internet network 102, and the computer could be replaced by the terminals including but not limited to the PDA, notebook, cellular, tablet, or the smart phone, which are able to access the Internet network 102. The data exchange between them could be implemented directly through Internet 102.

The terminals 140, 150 and 160 and terminals 110, 120 and 130, for instance, are situated in different networks, which are Internet 102 and mobile phone network 104. The two types of terminals therefore could not communicate with each other directly. According to the preferred embodiment of the present invention, an exchanging service mechanism 108 bridging the two different networks is provided to facilitate the communication between terminals in the two networks. Namely, the exchanging service mechanism 108 is able to relay and link services between systems or networks.

An access point 106 or 116 is coupled to the internet network to provide the entry to the local area network for wireless communication. One aspect of the present invention is that the system includes a portable communication device 100, such as tablet, smart phone, with dual network capability. It means that the portable communication device 100 may transmit and receive information through the mobile phone network or the Internet. The transmitted or the received information includes audio signal, video signal, text data or the combination thereof.

Figure 2:
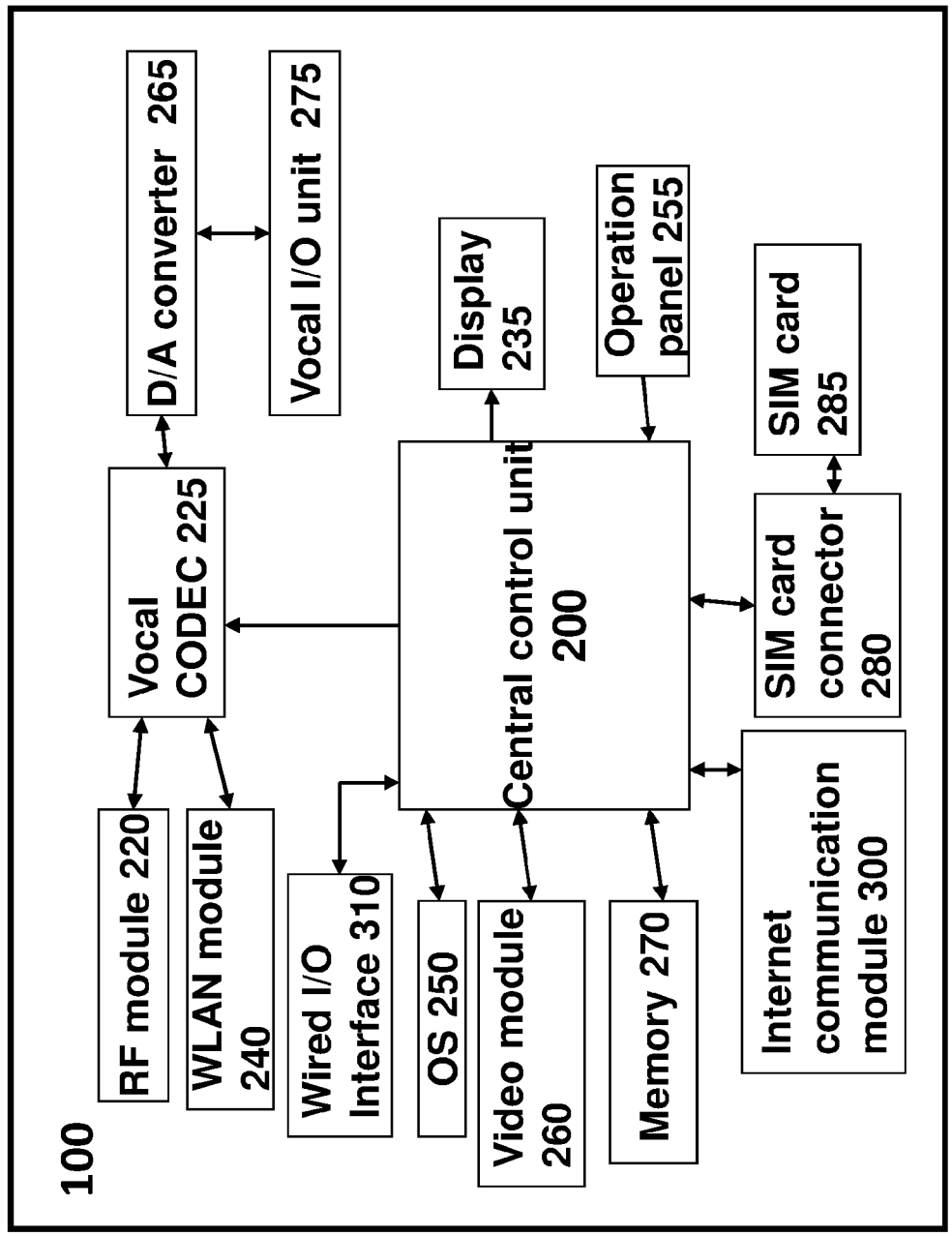
FIG. 2 is a block diagram showing one embodiment of the portable phone device of the present invention.

Referring to FIG. 2, it illustrates the functional diagram of the portable communication device 10 with dual networks capability. The dual way portable communication terminal 10 with SIM card connector 280 to carry the SIM card 285, it is well known in the art, the SIM card is not necessary for some other type of cellular such as PHS system. The diagram is used for illustrating and not used for limiting the scope of the present invention. The portable communication terminal or device 10 includes a RF module 220 to transmit or receive mobile phone signal and it is well known in the art. As known in the art, it may include a RF unit, an antenna, DSP, base band processor and so on. This antenna is connected to a transceiver, which is used to receive and transmit signal. The RF module 220 is compatible to the mobile phone protocol such as GSM, CDMA, PHS system. The RF module 220 may perform the function of signal transmitting and receiving, frequency synthesizing, baseband processing and digital signal processing. The SIM card hardware interface is used for receiving a SIM card. Finally, the signal is send to the final actuators, i.e. a vocal I/O unit 275 including loudspeaker and a microphone.

The portable communication device 10 includes CODEC 225 and A/D converter 265 as well. Both of the modules 220, 240 are coupled to the CODEC 225. Due to the RF module 220 is not the feature of the present invention, therefore, the detailed description is omitted. The present invention includes a central control unit 200, an operation panel 225, a build-in display 235, OS (operation system) 250 and memory 270 including a ROM program memory, a RAM memory and a nonvolatile FLASH memory. All of the units mentioned above are coupled to the central control unit 200, respectively. The memory could be micro-type hard disc. A wired I/O interface 310 is coupled to the central control unit 200. The wired I/O interface 310 could be USB, IEEE1394.

One aspect of the present invention is that the device 10 further includes a wireless local area network (WLAN) module 240. It could be compatible to the local area network protocol or standard such as Bluetooth standard, Wi-Fi standard or 802.11 standard compatible module. Further, the wireless local area network (WLAN) module could be compatible to the WiMAX (Worldwide Interoperability for Microwave Access) standard. An Internet communication module 300 is coupled to the central control unit 200 to allow transmit and receive the audio, video, text data or the combination signal to/from the internet network through the local area wireless transmission module 240. The Internet communication module 300 at least meets the standard of Voice Over Internet Protocol (VoIP). By employing the Internet communication module 300 and the wireless local area network module 240, the user may portably, synchronously transmit and receive the vocal, video, text data or the combination signal through the internet by using the internet communication module 300. An image capturing module 260 is required and coupled to the central control unit 200 to catch the video image if the user would like to conduct the real-time video transmission. The image capturing module could be digital still camera, digital video camera. Therefore, the real-time portable conference is possible. In another embodiment, the one difference is that the device may omit the RF module 220.

The system of FIG. 1 may couple to PSTN for linking to the home telephone system. The service relay may connect to the telephone with the link information through Internet. It should be appreciated that the device types of terminals could be varied depending on the support of available networks. The present invention would encompass possible communication devices with the ability to access the various networks.

The device may couple to the internet via the wired data I/O interface 310 or the WLAN module 240 to upload or download data including digital data such as text format, image format, audio signal, video signal. The wired data I/O interface 310 is coupled to the central control unit 200. The application of the apparatus is quite economical and convenience. Moreover, the user may call other one by the internet communication module 300 to reduce the transmission fee when the local area wireless transmission module 240 detects the signal of the internet network. Otherwise, the user may use the GSM CDMA or PHS system. The portable real-time video conference is possible by implementation of the present invention. Further, the present invention provides dual way (transmission and receiving) portable audio/video communication, synchronously.

Figure 3:
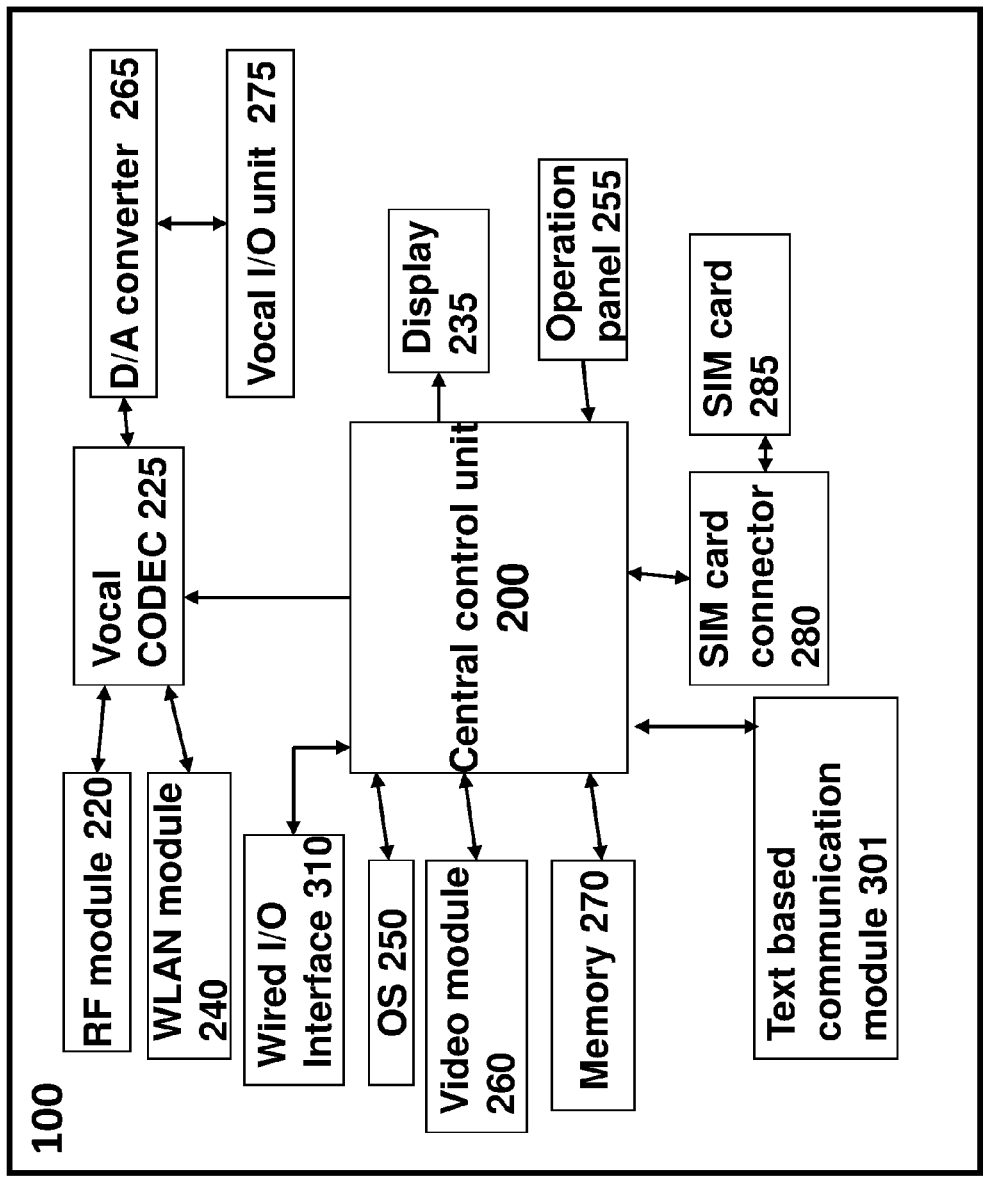
FIG. 3 is a block diagram showing one embodiment of the portable phone device of the present invention.

The present invention further provides a text based communication module 301, as shown in FIG. 3. The text based communication module 301 is coupled to the central control unit 200. The text based communication module 301 may be embedded into the portable communication device, such as tablet or smart phone, 100 or created by an external apparatus, such as a remote server. For example, the text based communication module 301 is downloaded into the portable communication device 100 from a remote server. The text based communication module 301 may synchronously transmit or receive data through the local area network, wherein the data is text, audio, video or the combination thereof. Thus, the invention provides a text based communication module 301 to the portable communication device 100 with a wireless local area network (LAN) module 240 to access internet network 102 and establish communication with first target terminal and second target terminal via Internet network 102 using the wireless LAN module 240, referring to FIG. 1 and FIG. 3. The first target terminal and the second target terminal are portable phone devices which may be smart phone, computer or tablet.

Figure 4:
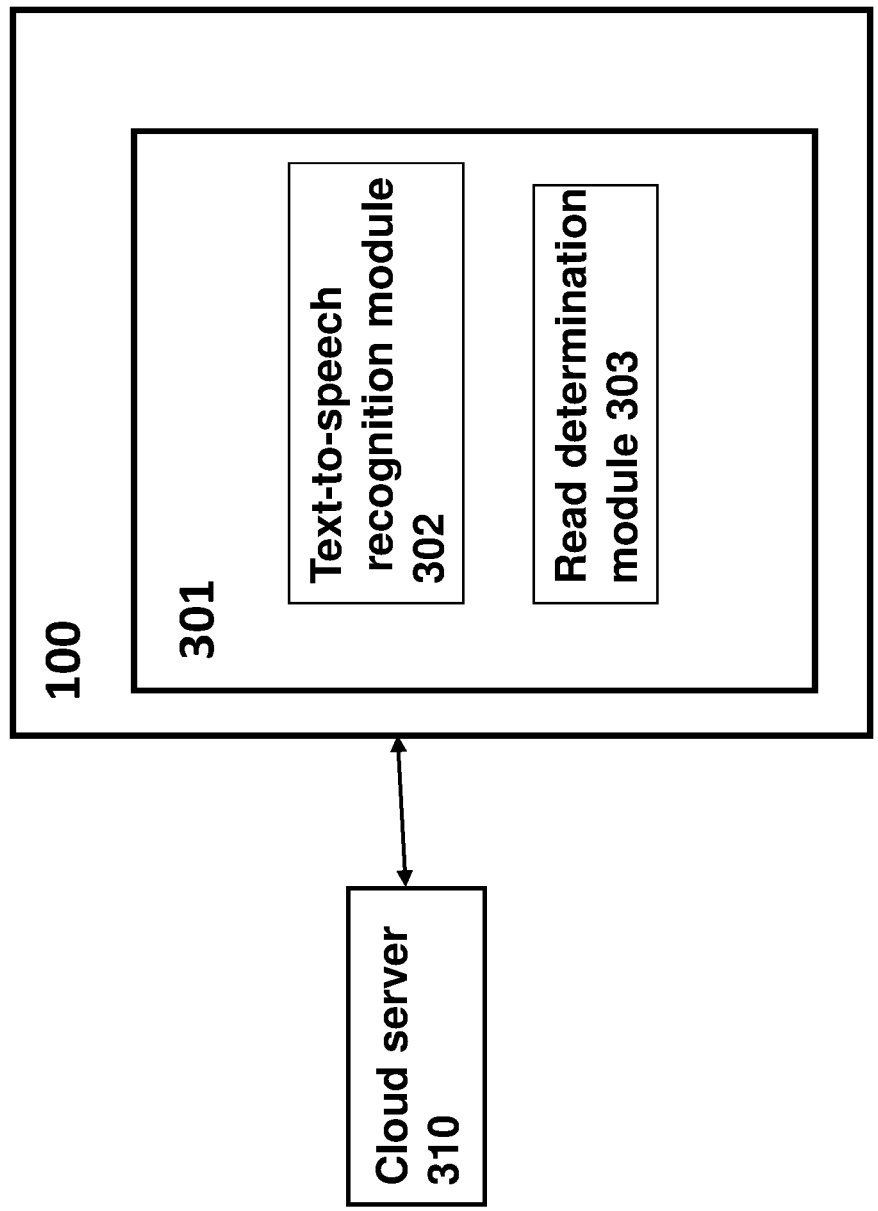
FIG. 4 is a block diagram showing another embodiment of a text based communication module of the portable phone device of the present invention.

The text based communication module 301 of the present invention includes a text-to-speech recognition module (engine) 302 which is embedded into the text based communication module 301 or downloaded from a remote (cloud) server 310 into the portable communication device 100, shown in FIG. 4. For example, the text-to-speech recognition module 302 is an automatic text-to-speech recognition module. The text-to-speech recognition module 302 is responsible for converting a text data received by the text based communication module 301 into speech (audio data) and outputting the transferred speech (audio data) to a user by a speaker or speakers of the, computer, smart phone or the tablet. In one embodiment, the text-to-speech recognition module 302 includes an acoustic dictionary and a sound matching module. The text-to-speech recognition module 302 is coupled to the central control unit 200. The text-to-speech recognition module 302 is configured to process text data to generate an associated audio data. The text data is transmitted by the text based communication module 301 of the first target terminal to that of the second target terminal via the remote server 310. Thus, the invention provides a text-to-speech function capable of transferring text data into speech for outputting, and a person can hear the transferred text audio content (such as pronounced by Chinese, English, or Japanese language, etc.) without reading the text data (which may be or be not displayed on a smart phone screen). The audio is processed through the text-to-speech recognition module 302 in real time, which may be performed at high speed.

The text based communication module 301 of the present invention may further include a read determination module 303 which is embedded into the text based communication module 301 or downloaded from a remote (cloud) server 310 into the portable communication device 100, shown in FIG. 4. For example, the read determination module 303 is an automatic read determination module. The read determination module 303 is responsible for determining read target terminals and unread target terminals when a user of the portable communication device 100 transmits a "text message" to a portable phone conversation or chat (communication) group, such as Line Group, WeChat Group. The read determination module 303 is coupled to the central control unit 200. The read determination module 303 is configured to generate a list of read and unread of the associated target terminals of the portable phone conversation group. The list of read and unread of the associated target terminals of the portable phone conversation group may be displayed on the portable phone screen by touching the "text message" displayed on the portable phone screen. The text message is transmitted by the text based communication module 301 of the target terminal to that of the associated portable phone conversation group via the remote server 310. The "text message" is transmitted through the text based communication module 301 in real time, which may be performed at high speed.

Figure 5:
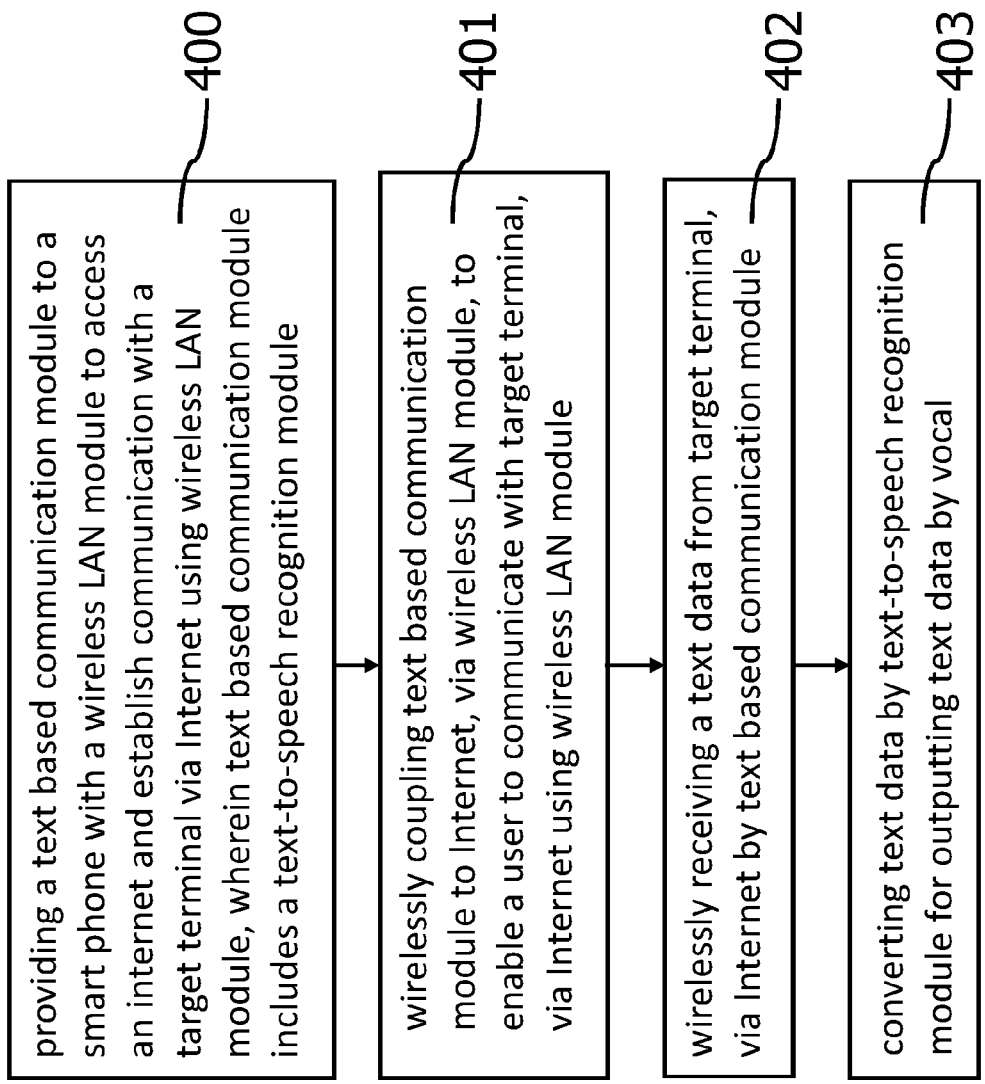
FIG. 5 is a process flow of a method for a smart phone having a wireless local area network (LAN) module to communicate through one of a mobile phone network and an Internet of the present invention.

The present invention discloses a method for a smart phone having a wireless local area network (LAN) module to communicate through one of a mobile phone network and an Internet, shown in FIG. 5. The method comprises the following steps. In step 400, a text based communication module is provided to the smart phone with the wireless local area network (LAN) module to access the internet and establish communication with a target terminal via the Internet using the wireless LAN module, wherein the text based communication module includes a text-to-speech recognition module. In step 401, the text based communication module is wirelessly coupled to the Internet, via the wireless LAN module, to enable a user to communicate with the target terminal, via the Internet using the wireless LAN module. In step 402, a text data is wirelessly received from the target terminal, via the Internet by the text based communication module. In step 403, the text data is converted by the text-to-speech recognition module for outputting the text data by vocal.

Figure 6:
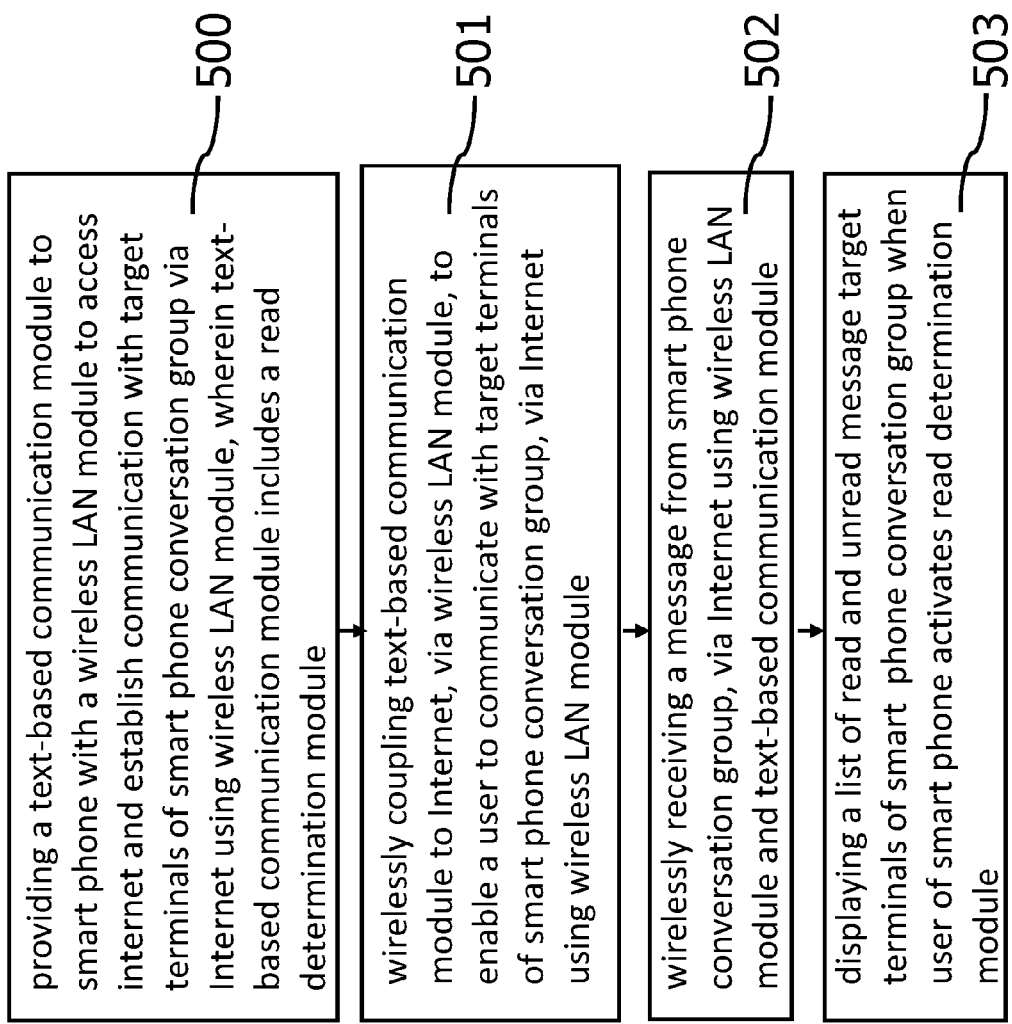
FIG. 6 is a process flow of a group conversation method for a smart phone through one of a mobile phone network and an Internet of the present invention.

The present invention discloses a group conversation method for a smart phone through one of a mobile phone network and an Internet, shown in FIG. 6. The method comprises the following steps. In step 500, a text-based communication module is provided to the smart phone with a wireless local area network (LAN) module to access the internet and establish communication with target terminals of the smart phone conversation group via the Internet using the wireless LAN module, wherein the text-based communication module includes a read determination module. In step 501, the text-based communication module is wirelessly coupled to the Internet, via the wireless LAN module, to enable a user to communicate with the target terminals of the smart phone conversation group, via the Internet using the wireless LAN module. In step 502, a message is wirelessly received from the smart phone conversation group, via the Internet using the wireless LAN module and the text-based communication module. In step 503, a list of read and unread message target terminals of the smart phone conversation group is displayed when the user of the smart phone activates the read determination module.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure. While the preferred embodiment of the invention has been illustrated and described, it will be appreciated that various changes can be made therein without departing from the spirit and scope of the invention.

We claim:

1. A method for a smart phone having a wireless local area network (LAN) module to communicate through one of a mobile phone network and an Internet, the method comprising:

providing a text based communication module to be embedded into said smart phone with said wireless local area network (LAN) module to access said internet and establish communication with a target terminal via said Internet using said wireless LAN module or said mobile phone network, wherein said text based communication module includes a text-to-speech recognition module;

wirelessly coupling said text based communication module to said Internet by internally coupled to said wireless LAN module, to enable a user to communicate with said target terminal, via said Internet using said wireless LAN module or said mobile phone network;

wirelessly receiving a text data from said target terminal, via said Internet by said text based communication module; and converting said text data by said text-to-speech recognition module to output said text data by vocal.

2. The method as claimed in claim 1, wherein said wireless LAN module is in compliant with a Wi-Fi standard.

3. The method as claimed in claim 1, wherein said wireless LAN module is in compliant with a 802.11 standard.

4. The method as claimed in claim 1, wherein said wireless LAN module includes Bluetooth standard compatible module.

5. The method as claimed in claim 1, wherein said text based communication module is embedded into said smart phone or downloaded from a remote server into said smart phone.

6. The method as claimed in claim 1, wherein said smart phone is further configured to enable said user to make a telephone call through said Internet when said wireless LAN module detects signals emitted from an access point (AP) of a local area network (LAN).

7. The method as claimed in claim 1, further comprising providing an access point coupled between said LAN and said smart phone.

8. The method as claimed in claim 1, further comprising providing an exchanging service mechanism for bridging said internet network and said mobile phone network to facilitate the communication there between.

9. A group conversation method for a smart phone through one of a mobile phone network and an Internet, the method comprising:
- providing a text-based communication module to be embedded into said smart phone with a wireless local area network (LAN) module to access said internet and establish communication with target terminals of said smart phone conversation group via said Internet using said wireless LAN module or said mobile phone network, wherein said text-based communication module includes a read determination module;
- wirelessly coupling said text-based communication module to said Internet by internally coupled to said wireless LAN module, to enable a user to communicate with said target terminals of said smart phone conversation group, via said Internet using said wireless LAN module or said mobile phone network;
- wirelessly receiving a message from said smart phone conversation group, via said Internet using said wireless LAN module and said text-based communication module; and
- displaying a list of read and unread message target terminals of said smart phone conversation group when said user of said smart phone activates said read determination module.

10. The method as claimed in claim 9, wherein said wireless LAN module is in compliant with a Wi-Fi standard.

11. The method as claimed in claim 9, wherein said wireless LAN module is in compliant with a 802.11 standard.

12. The method as claimed in claim 9, wherein said wireless LAN module includes Bluetooth standard compatible module.

13. The method as claimed in claim 9, wherein said text-based communication module is embedded into said smart phone or downloaded from a remote server into said smart phone.

14. The method as claimed in claim 9, wherein said displaying a list of read and unread message target terminals of said smart phone conversation group is activated by touching said message displayed on a screen of said smart phone.

15. The method as claimed in claim 9, wherein said smart phone is further configured to enable said user to make a telephone call through said Internet.

16. The method as claimed in claim 9, further comprising providing an access point coupled between said LAN and said smart phone.

17. The method as claimed in claim 16, further comprising providing an exchanging service mechanism for bridging said internet network and said mobile phone network to facilitate the communication there between.

\* \* \* \* \*